United States Patent
Wang et al.

(10) Patent No.: US 12,234,395 B2
(45) Date of Patent: Feb. 25, 2025

(54) PRESSURE-SENSITIVE ADHESIVE COMPOSITION AND PRESSURE-SENSITIVE ADHESIVE TAPE

(71) Applicant: 3M INNOVATIVE PROPERTIES COMPANY, St. Paul, MN (US)

(72) Inventors: Weina Wang, Shanghai (CN); Lu Shen, Shanghai (CN); Yunshu Zhang, Shanghai (CN); Yu Che, Shanghai (CN); Panpan Lin, Shanghai (CN); Heng Liu, Shanghai (CN); Xiaohai Sheng, Shanghai (CN); Shupeng Wu, Suzhou (CN); Xiangming Yang, Shanghai (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 204 days.

(21) Appl. No.: 17/793,477

(22) PCT Filed: Jan. 18, 2021

(86) PCT No.: PCT/IB2021/050360
§ 371 (c)(1),
(2) Date: Jul. 18, 2022

(87) PCT Pub. No.: WO2021/148931
PCT Pub. Date: Jul. 29, 2021

(65) Prior Publication Data
US 2023/0084796 A1 Mar. 16, 2023

(30) Foreign Application Priority Data
Jan. 21, 2020 (CN) .......................... 202010073125.2

(51) Int. Cl.
*B32B 41/00* (2006.01)
*C09J 7/24* (2018.01)
(Continued)

(52) U.S. Cl.
CPC ............... *C09J 7/385* (2018.01); *C09J 7/245* (2018.01); *C09J 7/403* (2018.01); *C09J 11/06* (2013.01);
(Continued)

(58) Field of Classification Search
CPC ... C09J 7/385; C09J 7/245; C09J 7/403; C09J 11/06; C09J 133/10; C09J 2301/122;
(Continued)

(56) References Cited

U.S. PATENT DOCUMENTS

| 4,605,592 A | 8/1986 | Paquette et al. |
| 5,194,486 A | 3/1993 | Levine et al. |

(Continued)

FOREIGN PATENT DOCUMENTS

| CN | 101935508 A | 1/2011 |
| CN | 101638565 B | 6/2012 |

(Continued)

OTHER PUBLICATIONS

International Search Report for PCT International Application No. PCT/IB2021/050360, mailed on Apr. 16, 2021, 4 pages.

*Primary Examiner* — Michael N Orlando
*Assistant Examiner* — Joshel Rivera
(74) *Attorney, Agent, or Firm* — Jeffrey M. Olofson (57) ABSTRACT

The present invention provides a pressure-sensitive adhesive composition, including: an acrylic copolymer and a crosslinking agent. The acrylic copolymer is a reaction product of a mixture of the following monomers: a first alkyl (meth) acrylate, an alkyl group in the first alkyl (meth)acrylate having at least 6 carbon atoms; a second alkyl (meth) acrylate, an alkyl group in the second alkyl (meth)acrylate having 1 to 5 carbon atoms; and a vinyl carboxylic acid, the weight ratio of the vinyl carboxylic acid to the mixture being 4% to 5%. The crosslinking agent is an organometallic (Continued)

chelating agent. The weight ratio of the organometallic chelating agent to the mixture is 0.05% to 0.25%. The pressure-sensitive adhesive composition does not contain an effective amount of a tackifier. The present invention further provides a pressure-sensitive adhesive solution, a pressure-sensitive adhesive tape, and a method for preparing the same. The pressure-sensitive adhesive of the present invention is a removable pressure-sensitive adhesive, and is applicable in hot weather and cold weather, and the adhesiveness of the pressure-sensitive adhesive does not decrease over time.

16 Claims, 2 Drawing Sheets

(51) Int. Cl.
  *C09J 7/38* (2018.01)
  *C09J 7/40* (2018.01)
  *C09J 11/06* (2006.01)
  *C09J 133/10* (2006.01)
(52) U.S. Cl.
  CPC ....... *C09J 133/10* (2013.01); *C09J 2301/122* (2020.08); *C09J 2301/302* (2020.08); *C09J 2301/312* (2020.08); *C09J 2301/408* (2020.08); *C09J 2301/41* (2020.08); *C09J 2301/416* (2020.08)
(58) Field of Classification Search
  CPC ............ C09J 2301/302; C09J 2301/312; C09J 2301/408; C09J 2301/41; C09J 2301/416; C09J 4/00; C09J 2203/37; C09J 2301/414; C09J 2427/006; C09J 2433/00; C09J 133/08; C08F 220/1808; C08F 220/1804; C08F 220/06; C08K 5/0091; C08K 5/0025

USPC .................. 156/60, 64, 350, 351, 378, 379
See application file for complete search history.

(56) References Cited

U.S. PATENT DOCUMENTS

| | | |
|---|---|---|
| 5,209,931 A | 5/1993 | Levin |
| 8,152,944 B2 | 4/2012 | Ellringmann et al. |
| 9,834,706 B2 | 12/2017 | Yutou et al. |
| 10,100,233 B2 | 10/2018 | Zajaczkowski et al. |
| 2005/0181148 A1 | 8/2005 | Kim et al. |
| 2008/0280036 A1 | 11/2008 | Mesa |
| 2010/0330354 A1 | 12/2010 | Tsukagoshi et al. |
| 2011/0104486 A1* | 5/2011 | Ma .................. C09J 193/04 524/502 |
| 2012/0000599 A1 | 1/2012 | Takatsu et al. |
| 2013/0040069 A1* | 2/2013 | Craton .................. C09J 133/10 427/516 |
| 2013/0303958 A1 | 11/2013 | Holm et al. |
| 2015/0252227 A1 | 9/2015 | Zajaczkowski et al. |
| 2015/0259576 A1 | 9/2015 | Yutou |
| 2017/0292040 A1 | 10/2017 | Aleed et al. |

FOREIGN PATENT DOCUMENTS

| | | |
|---|---|---|
| CN | 108017969 A | 5/2018 |
| CN | 104910824 B | 5/2020 |
| EP | 0485708 B1 | 1/1997 |
| EP | 0638111 B1 | 2/1997 |
| EP | 0973841 B1 | 8/2004 |
| JP | 2008308527 A | 12/2008 |
| KR | 101960884 B1 | 3/2019 |
| WO | 2003029372 A2 | 4/2003 |

* cited by examiner

PRESSURE-SENSITIVE ADHESIVE COMPOSITION AND PRESSURE-SENSITIVE ADHESIVE TAPE

CROSS REFERENCE TO RELATED APPLICATIONS

This application is a national stage filing under 35 U.S.C. 371 of PCT/IB2021/050360, filed Jan. 18, 2021, which claims the benefit of Chinese Patent Application No. 202010073125.2, filed Jan. 21, 2020, the disclosure of which is incorporated by reference in its/their entirety herein.

TECHNICAL FIELD

The present invention relates to the field of pressure-sensitive adhesives, and in particular to a pressure-sensitive adhesive composition and a pressure-sensitive adhesive tape.

BACKGROUND

Currently, removable pressure-sensitive adhesive tapes are widely used. A pressure-sensitive adhesive tape generally consists of a substrate and a pressure-sensitive adhesive applied thereon. Common substrates include a polyvinyl chloride (PVC) film.

The stability of adhesion of a polyvinyl chloride film-based pressure-sensitive adhesive tape is not good. After the pressure-sensitive adhesive tape is adhered for a period of time, or even after the pressure-sensitive adhesive tape is stored for a period of time, the adhesiveness of the pressure-sensitive adhesive tape may decrease.

In addition, the properties of conventional polyvinyl chloride film-based pressure-sensitive adhesive tapes may also be affected by temperature. When some polyvinyl chloride film-based pressure-sensitive adhesive tapes are removed from an adhesion surface in hot weather, adhesive residues may remain on the adhesion surface. Other polyvinyl chloride film-based pressure-sensitive adhesive tapes have poor initial tack when used in cold weather.

Therefore, improvements to polyvinyl chloride film-based pressure-sensitive adhesive tapes are still desired.

SUMMARY

In one aspect, the present invention provides a pressure-sensitive adhesive composition, the pressure-sensitive adhesive composition comprising:
 an acrylic copolymer; and
 a crosslinking agent, wherein
 the acrylic copolymer is a reaction product of a mixture of the following monomers:
  a first alkyl (meth)acrylate, an alkyl group in the first alkyl (meth)acrylate having at least 6 carbon atoms;
  a second alkyl (meth)acrylate, an alkyl group in the second alkyl (meth)acrylate having 1 to 5 carbon atoms; and
  a vinyl carboxylic acid, the weight ratio of the vinyl carboxylic acid to the mixture being 4% to 5%;
 the crosslinking agent is an organometallic chelating agent, the weight ratio of the organometallic chelating agent to the mixture being 0.05% to 0.25%, wherein
 the pressure-sensitive adhesive composition does not contain an effective amount of a tackifier.

Optionally, the glass transition temperature of the acrylic copolymer is between −65° C. and −50° C.

Optionally, the weight average molecular weight of the acrylic copolymer is in the range of 100,000 to 1,000,000, and the intrinsic viscosity is in the range of 0.80 to 1.20.

Optionally, in the mixture, the weight ratio of the first alkyl (meth)acrylate to the second alkyl (meth)acrylate is between 0.99:1 and 1:0.97.

Optionally, the glass transition temperature of a homopolymer of the first alkyl (meth)acrylate is lower than −40° C.

Optionally, the first alkyl (meth)acrylate is selected from a group consisting of: 2-ethylhexyl (meth)acrylate, isooctyl (meth)acrylate, octyl acrylate, and combinations thereof.

Optionally, the first alkyl (meth)acrylate is 2-ethylhexyl acrylate.

Optionally, the glass transition temperature of a homopolymer of the second alkyl (meth)acrylate is lower than 10° C.

Optionally, the second alkyl (meth)acrylate is selected from a group consisting of: butyl (meth)acrylate, ethyl acrylate, methyl acrylate, and combinations thereof.

Optionally, the second alkyl (meth)acrylate is butyl acrylate.

Optionally, the glass transition temperature of a homopolymer of the vinyl carboxylic acid is in the range of 80° C. to 240° C.

Optionally, the vinyl carboxylic acid comprises (meth) acrylic acid.

Optionally, the vinyl carboxylic acid is acrylic acid.

Optionally, the organometallic chelating agent is aluminum acetylacetonate.

In another aspect, the present invention provides a pressure-sensitive adhesive tape, comprising:
 a polyvinyl chloride film containing a plasticizer; and
 a layer of the aforementioned pressure-sensitive adhesive composition on the polyvinyl chloride film.

Optionally, the thickness of the layer of the pressure-sensitive adhesive composition is 20 μm to 40 μm.

Optionally, the thickness of the polyvinyl chloride film is 80 μm to 120 μm.

Optionally, the breaking strength of the polyvinyl chloride film in a lengthwise direction is 3100 Psi or greater.

Optionally, the elongation at break of the polyvinyl chloride film in the lengthwise direction is 100% or greater.

In another aspect, the present invention provides a pressure-sensitive adhesive solution, the pressure-sensitive adhesive solution comprising the aforementioned pressure-sensitive adhesive composition and a solvent.

Optionally, the weight ratio of the acrylic copolymer to the pressure-sensitive adhesive solution is 20% to 50%.

In another aspect, the present invention provides a method for preparing a pressure-sensitive adhesive tape, comprising:
 coating a release layer with the aforementioned pressure-sensitive adhesive solution;
 evaporating the solvent in the pressure-sensitive adhesive solution so as to form a pressure-sensitive adhesive composition layer on the release layer; and
 laminating a polyvinyl chloride film on a surface of the pressure-sensitive adhesive composition layer so as to form the pressure-sensitive adhesive tape.

DETAILED DESCRIPTION

The present invention provides a pressure-sensitive adhesive composition. The pressure-sensitive adhesive composition is particularly applicable to preparation of a removable pressure-sensitive adhesive tape on a PVC film substrate containing a plasticizer, and the adhesive tape has good aging resistance. In addition, the pressure-sensitive adhesive composition has satisfactory properties at usual use temperatures in both hot weather and cold weather.

After an existing removable PVC film-based pressure-sensitive adhesive tape is adhered to a surface of an object such as a surface of a printed object for a period of time, adhesiveness generally decreases. Without relying on any theory, the inventor of the present invention found that this may be attributed to plasticizers commonly used in PVC. The plasticizer in the PVC will migrate from the PVC to a pressure-sensitive adhesive over time, and further migrate to an interface between the pressure-sensitive adhesive tape and the surface of the object. The accumulation of the plasticizer destroys the interface, resulting in decreased adhesiveness. This situation even occurs during storage of the adhesive tape. After the adhesive tape is stored for a period of time, the plasticizer accumulates at an adhesion interface of the pressure-sensitive adhesive tape, causing the initial tack of the pressure-sensitive adhesive tape to decrease. In severe cases, during use, this type of adhesive tape may warp at edges, or may even fail in adhesion.

In addition, existing pressure-sensitive adhesives generally cannot be used in both hot and cold environments. The properties of the pressure-sensitive adhesive are related to the glass transition temperature (Tg) of the pressure-sensitive adhesive. If the glass transition temperature of the pressure-sensitive adhesive is overly high, the initial tack is low. In this case, the pressure-sensitive adhesive is overly hard, and is likely to warp at edges in cold weather such as in winter. If the glass transition temperature of the pressure-sensitive adhesive is overly low, the initial tack is high. However, the pressure-sensitive adhesive is overly soft, and in hot weather such as in summer, adhesive residues remain after removal of the pressure-sensitive adhesive.

Regarding the above problems, the inventor of the present invention provides a pressure-sensitive adhesive composition, the pressure-sensitive adhesive composition including:
an acrylic copolymer; and
a crosslinking agent, where
the acrylic copolymer is a reaction product of a mixture of the following monomers:
a first alkyl (meth)acrylate, an alkyl group in the first alkyl (meth)acrylate having at least 6 carbon atoms;
a second alkyl (meth)acrylate, an alkyl group in the second alkyl (meth)acrylate having 1 to 5 carbon atoms; and
a vinyl carboxylic acid, the weight ratio of the vinyl carboxylic acid to the mixture being 4% to 5%;
the crosslinking agent is an organometallic chelating agent, the weight ratio of the organometallic chelating agent to the mixture being 0.05% to 0.25%, where
the pressure-sensitive adhesive composition does not contain an effective amount of a tackifier.

As a removable pressure-sensitive adhesive, the pressure-sensitive adhesive composition of the present invention has good initial tack and appropriate adhesiveness, is not prone to warping at edges when applied in cold weather, and does not leave adhesive residues when peeled off in hot weather. The pressure-sensitive adhesive composition is especially applicable to a PVC film containing a plasticizer, and can reduce a decrease in adhesiveness caused by aging.

The pressure-sensitive adhesive composition of the present invention contains an acrylic copolymer, and the acrylic copolymer is a reaction product of a mixture of the following monomers: a first alkyl (meth)acrylate, an alkyl group in the first alkyl (meth)acrylate having at least 6 carbon atoms; a second alkyl (meth)acrylate, an alkyl group in the second alkyl (meth)acrylate having 1 to 5 carbon atoms; and a vinyl carboxylic acid.

In the present invention, the alkyl (meth)acrylate indicates an alkyl acrylate and/or an alkyl methacrylate. For example, butyl (meth)acrylate indicates butyl acrylate and/or butyl methacrylate.

In some embodiments, the first alkyl (meth)acrylate may be an alkyl (meth)acrylate containing an alkyl group having 8 carbon atoms, such as isooctyl (meth)acrylate and 2-ethylhexyl (meth)acrylate.

In some embodiments, the second alkyl (meth)acrylate may be an alkyl (meth)acrylate containing an alkyl group having 4 carbon atoms, such as butyl (meth)acrylate.

The vinyl carboxylic acid is a carboxylic acid containing an unsaturated double bond. In some embodiments, the vinyl carboxylic acid may be acrylic acid, methacrylic acid, itaconic acid, maleic acid, fumaric acid, or carboxyethyl β-acrylate. Preferably, the vinyl carboxylic acid is acrylic acid. In the present invention, the weight ratio of the vinyl carboxylic acid to the aforementioned mixture is 4% to 5%.

The inventor of the present invention found that a composition formed by mixing the reaction product of the mixture of the above three types of monomers with an organometallic chelating agent-type crosslinking agent of a specific content is a pressure-sensitive adhesive composition. The pressure-sensitive adhesive composition can effectively prevent a plasticizer from migrating therein. The above crosslinking agent causes the above acrylic copolymer to form a special crosslinked network. The crosslinked network has appropriate density, porosity, and flexibility, and a plasticizer escaping from PVC can be accommodated in pores of the crosslinked network, thereby preventing the plasticizer from continuing to migrate. In this way, when the pressure-sensitive adhesive composition is used for a PVC film for the preparation of a pressure-sensitive adhesive tape, a decrease in adhesiveness (also referred to as aging herein) caused by damage to an adhesion interface due to migration of a plasticizer over time can be prevented.

Particularly, the pressure-sensitive adhesive composition of the present invention does not contain an effective amount of a tackifier. In other words, the pressure-sensitive adhesive composition of the present invention contains substantially no tackifier. In the present invention, the containing no effective amount of a tackifier or the containing substantially no tackifier indicates that no tackifier is contained at all, or that a tackifier is contained but the amount of the tackifier is sufficiently small to have a negligible effect on the properties of the composition. In the case where the pressure-sensitive adhesive composition does not contain an effective amount of a tackifier, the weight ratio of the tackifier to the acrylic copolymer in the pressure-sensitive adhesive composition can be 1% or less, preferably 0.5% or less, preferably 0.1% or less, preferably 0.05% or less, preferably 0.02% or less, preferably 0.01% or less, preferably 50 ppm or less, preferably 20 ppm or less, and preferably 10 ppm or less, and most preferably no tackifier is contained at all. The addition of the tackifier will increase the adhesiveness of the pressure-sensitive adhesive composition of the present invention, resulting in remaining adhesive residues on an adhesion surface after removal in hot weather. Generally, the tackifier is a material that is compatible with the acrylic copolymer and has a glass transition temperature higher than that of the acrylic copolymer. The tackifier may be a conventional tackifier for polyacrylate pressure-sensitive adhesives, for example, a tackifying resin such as petroleum resin, terpene resin, rosin resin, etc.

The inventor surprisingly found that although no effective amount of a tackifier is used, the pressure-sensitive adhesive composition of the present invention still maintains relatively low tack and appropriate cohesion. The initial tack can be in the range of 8-15 N/inch or about 0.3-0.6 N/mm. The relatively low initial tack can allow removal and re-position for adhesion during adhesion. The appropriate cohesion can eliminate adhesive residues even when peeling is performed in hot weather. Without relying on any theory, this can be attributed to the following two factors: one is that the acrylic copolymer of the present invention has an appropriate glass transition temperature; the other is that a certain variable amount of an organometallic chelating agent is used as the crosslinking agent in the present invention. A certain variable amount of organometallic chelating agent is combined with the acrylic copolymer of the present invention, thereby ensuring sufficient cohesive strength of the pressure-sensitive adhesive without an effective amount of a tackifier.

In addition, the bonding between the pressure-sensitive adhesive composition of the present invention and a PVC film substrate is excellent, and the adhesiveness is stable during storage.

Optionally, the glass transition temperature of the acrylic copolymer is between −65° C. and −50° C. This glass transition temperature causes the pressure-sensitive adhesive composition to have low initial tack at usual use temperatures. The glass transition temperature of the acrylic copolymer can be estimated and adjusted from the glass transition temperatures of homopolymers of the monomers according to the Fox formula well known in the art. For example, the glass transition temperatures of homopolymers of the first alkyl (meth)acrylate and the second alkyl (meth)acrylate can independently be −40° C. or lower and 10° C. or lower respectively, and the glass transition temperature of a homopolymer of the vinyl carboxylic acid can be between 80° C. and 240° C.

Optionally, the weight average molecular weight of the acrylic copolymer is in the range of 100,000 to 1,000,000. The copolymer having this weight average molecular weight is advantageous in that the pressure-sensitive adhesive has lower initial tack and good cohesive strength.

Optionally, the intrinsic viscosity of the acrylic copolymer is in the range of 0.80 to 1.20. When the intrinsic viscosity is overly low, the cohesive strength of the pressure-sensitive adhesive is overly low. When the intrinsic viscosity is overly high, the initial tack of the pressure-sensitive adhesive is overly low.

Optionally, in the mixture, the weight ratio of the first alkyl (meth)acrylate to the second alkyl (meth)acrylate is between 0.99:1 and 1:0.97. This weight ratio is advantageous in that the glass transition temperature is relatively low, and a balance between good initial tack and good cohesive strength can be achieved. The relative weight can be adjusted according to selected specific monomers and required properties such as the glass transition temperature.

Optionally, the glass transition temperature of the homopolymer of the first alkyl (meth)acrylate serving as one of comonomers is lower than −40° C. Such a monomer is a soft monomer. Preferably, the first alkyl (meth)acrylate is selected from a group consisting of: 2-ethylhexyl (meth)acrylate, isooctyl (meth)acrylate, octyl acrylate, and combinations thereof. More preferably, the first alkyl (meth)acrylate is 2-ethylhexyl acrylate.

Optionally, the glass transition temperature of the homopolymer of the second alkyl (meth)acrylate serving as one of the comonomers is lower than 10° C. Such a monomer is also a soft monomer. Preferably, the second alkyl (meth)acrylate is selected from a group consisting of: butyl (meth)acrylate, ethyl acrylate, methyl acrylate, and combinations thereof. More preferably, the second alkyl (meth)acrylate is butyl acrylate.

The weight ratio of the vinyl carboxylic acid to the mixture is 4% to 5%. When the weight of the vinyl carboxylic acid is overly high, the initial tack is overly high, rendering it not easy for removal when an adhesion position needs to be changed during application, and adhesive residues are highly prone to remaining after removal at the end of use; when the weight is overly low, the initial tack is overly low, rendering it difficult for adhesion, which is especially obvious during application in winter. The weight can be further adjusted according to selected specific monomers and required properties such as the glass transition temperature.

Optionally, the glass transition temperature of the homopolymer of the vinyl carboxylic acid is in the range of 80° C. to 240° C. This range is advantageous in that the overall glass transition temperature of the acrylic copolymer can be effectively adjusted.

Optionally, the vinyl carboxylic acid includes (meth)acrylic acid. More preferably, the vinyl carboxylic acid is acrylic acid.

In addition to the acrylic copolymer, another essential component in the pressure-sensitive adhesive composition of the present invention is the crosslinking agent. The inventor found that selecting an organometallic chelating agent as the crosslinking agent in combination with the corresponding acrylic copolymer of the present invention can notably improve the stability of adhesion of the pressure-sensitive adhesive composition, that is, the adhesiveness does not decrease significantly over time. Without relying on any theory, this may be attributed to that a dense network formed by such a specific crosslinking agent and the acrylic copolymer of the present invention is precisely suitable for trapping a plasticizer, thereby preventing the plasticizer from continuing to penetrate a pressure-sensitive adhesive layer to migrate to an interface between the pressure-sensitive adhesive layer and an adhered substrate.

Figure 1:
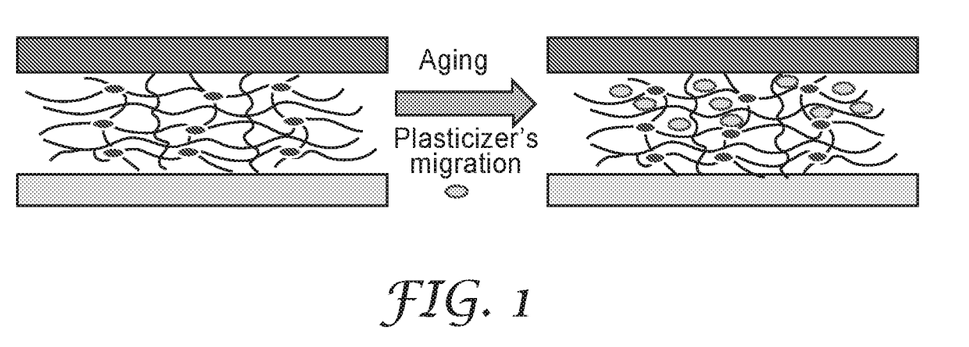
FIG. 1 shows a schematic diagram of a pressure-sensitive adhesive composition of the present invention preventing migration of a plasticizer.

FIG. 1 shows a schematic diagram of the pressure-sensitive adhesive composition of the present invention preventing migration of a plasticizer in a PVC adhesive tape, in which a dense network structure is formed by means of crosslinking. After an aging test, the crosslinked network has appropriate density and certain flexibility to confine the plasticizer commonly used in the PVC within the crosslinked network, thereby preventing the migration of the plasticizer from the PVC to an adhesion surface.

The dry weight ratio of the organometallic chelating agent to the mixture is 0.05% to 0.25%. The amount of the organometallic chelating agent used can be adjusted according to a required degree of crosslinking, but needs to be within the above range. When the ratio is overly low, improvements made by the organometallic chelating agent to the adhesiveness and aging stability are insufficient. When the ratio is overly high, the adhesiveness of an adhesive tape prepared using the organometallic chelating agent may be unstable. The organometallic chelating agent may include metal cations having a valence of greater than 2. A preferred example of the organometallic chelating agent can be aluminum acetylacetonate.

The pressure-sensitive adhesive composition does not contain an effective amount of a tackifier. However, the pressure-sensitive adhesive composition can contain an appropriate amount of other additives such as an antioxidant, a UV stabilizer, etc., as long as the additive does not have an adverse effect on the present invention regarding the stability of adhesion, the edge warpage resistance at low temperatures, and the amount of adhesive residues after removal at high temperatures.

The pressure-sensitive adhesive composition of the present invention is particularly applicable to preparation of a removable pressure-sensitive adhesive on a PVC film substrate containing a plasticizer. In addition, the pressure-sensitive adhesive composition has satisfactory properties at usual use temperatures in both hot weather and cold weather, and the properties remain stable within a certain period of storage time.

Accordingly, the present invention further provides a pressure-sensitive adhesive tape, including:

a polyvinyl chloride film containing a plasticizer; and a layer of the aforementioned pressure-sensitive adhesive composition on the polyvinyl chloride film, where the plasticizer can be any conventional plasticizer for a polyvinyl chloride film. The pressure-sensitive adhesive tape of the present invention has good stability of adhesion, which can be attributed to the effect of the pressure-sensitive adhesive composition in preventing the migration of the plasticizer.

Optionally, the thickness of the layer of the pressure-sensitive adhesive composition is 20 μm to 40 μm. This thickness can ensure good initial tack and bulk strength, and effectively prevent the plasticizer from migrating to an interface between the pressure-sensitive adhesive composition layer and an adhered substrate.

Optionally, the thickness of the polyvinyl chloride film is 80 μm to 120 μm. Optionally, the breaking strength of the polyvinyl chloride film in a lengthwise direction is 3100 Psi or greater. Optionally, the elongation at break of the polyvinyl chloride film in the lengthwise direction is 100% or greater. By selecting a polyvinyl chloride film having the above properties, a pressure-sensitive adhesive tape having good mechanical properties can be acquired.

The pressure-sensitive adhesive tape may further include a release film for protecting the pressure-sensitive adhesive layer. Before use, the release film is removed.

Accordingly, the present invention further provides a pressure-sensitive adhesive solution, the pressure-sensitive adhesive solution including the aforementioned pressure-sensitive adhesive composition and a solvent.

The pressure-sensitive adhesive solution containing the solvent is used for coating on the pressure-sensitive adhesive composition layer, so as to prepare, for example, a pressure-sensitive adhesive tape.

The solvent used can be any conventional solvent for coating of a pressure-sensitive adhesive.

Optionally, the weight ratio of the acrylic copolymer to the pressure-sensitive adhesive solution is 20% to 50%. This ratio can ensure appropriate leveling of the pressure-sensitive adhesive solution.

Accordingly, the present invention provides a method for preparing a pressure-sensitive adhesive tape, including:

coating a release layer with the aforementioned pressure-sensitive adhesive solution;

evaporating the solvent in the pressure-sensitive adhesive solution so as to form a pressure-sensitive adhesive composition layer on the release layer; and laminating a polyvinyl chloride film on a surface of the pressure-sensitive adhesive composition layer so as to form the pressure-sensitive adhesive tape.

The above method can be used for simple preparation of a pressure-sensitive adhesive tape.

The present invention is further described below by using examples. The examples are exemplary, and do not limit the present invention.

Feedstocks used in the examples of the present invention are listed in Table 1.

TABLE 1

| Component | Product Name | Supplier |
| --- | --- | --- |
| 2EHA | 2-ethylhexyl acrylate | BASF LLC |
| BA | Butyl acrylate | BASF LLC |
| AA | Acrylic acid | Sinopharm Chemical Reagent Co., Ltd. |
| Commercially available removable PVC adhesive tape | Avery 3002 | Avery |
| Organometallic chelating agent-type crosslinking agent | Aluminum acetylacetonate solution, with solid content of 5% | Sinopharm Chemical Reagent Co., Ltd. |
| Metal-free crosslinking agent | RD 1054 bisamide crosslinking agent solution, with solid content of 5% | 3M China Limited |
| Ethyl acetate | Ethyl acetate solvent | Sinopharm Chemical Reagent Co., Ltd. |
| Substrate | PVC film, containing plasticizers DOP and DINP | Commercially available |
| Release film | Release film | Micron |

PREPARATION EXAMPLE 1

Preparation of Acrylic Copolymer AC1

720 grams of 2-ethylhexyl acrylate (2-EHA), 712.5 grams of butyl acrylate (BA), 67.5 grams of acrylic acid (AA), 1775 grams of ethyl acetate (EtOAc, solvent), and 24 grams of isopropyl alcohol were added to a reactor. 1.2 grams of VAZO 67 (an azonitrile-type polymerization initiator) were dissolved in 20 g of ethyl acetate, and the mixture was added to the reactor. Stirring was performed, and purging was performed with nitrogen so as to remove all of oxygen. Then, the temperature was raised to 60° C., and a reaction was performed for 4 hours. Then, a fresh liquid mixture of 1.8 grams of VAZO 67 and 20 grams of ethyl acetate was added to the reactor, and the reaction was performed overnight at 65° C. Finally, a reaction product was mixed with an appropriate amount of EtOAc, so that the solid content thereof was diluted to about 40%, and a clear viscous solution was acquired. The percentage content of solids therein was measured (measurement was performed after drying at 105° C. for 3 hours) and the intrinsic viscosity (IV, 0.25 g/dL, in EtOAc) was measured.

Feedstocks, reaction temperatures, percentage contents of solids, and intrinsic viscosity are listed in Table 2.

PREPARATION EXAMPLE 2

Preparation of Acrylic Copolymer AC2

The acrylic copolymer was prepared using the same method as that of Preparation Example 1, and the difference lies in that heating temperatures of the two reaction stages are different. Feedstocks, reaction temperatures, percentage content of solids, and intrinsic viscosity are listed in Table 2.

PREPARATION EXAMPLE 3

Preparation of Acrylic Copolymer AC3

The acrylic copolymer was prepared using the same method as that of Preparation Example 1, and the difference lies in that heating temperatures of the two reaction stages are different. Feedstocks, reaction temperatures, percentage contents of solids, and intrinsic viscosity are listed in Table 2.

PREPARATION EXAMPLE 4

Preparation of Acrylic Copolymer AC4

The acrylic copolymer was prepared using the same method as that of Preparation Example 1, and the difference lies in that feedstock contents and heating temperatures are different. Specifically, the weights of 2-ethylhexyl acrylate, butyl acrylate, and acrylic acid were 697.5 grams, 690 grams, and 112.5 grams respectively. Feedstocks, reaction temperatures, percentage contents of solids, and intrinsic viscosity are listed in Table 2. In AC4, the content of acrylic acid is greater than 5%.

mixed liquid in which the dry weight ratio of the crosslinking agent to the acrylic copolymer is 0.2%.

The same method was used to prepare other pressure-sensitive adhesive-crosslinking agent mixed solutions having different degrees of crosslinking.

Preparation of Pressure-Sensitive Adhesive Tape

A release layer was coated with the pressure-sensitive adhesive-crosslinking agent mixed solution, and drying was performed in an oven at 105° C. for 10 minutes so as to form a dried pressure-sensitive adhesive composition layer having a thickness of about 20 μm to 40 μm. Finally, a corona-treated PVC film was laminated on a surface of the pressure-sensitive adhesive. The PVC film contains plasticizers DOP and DINP.

The prepared pressure-sensitive adhesive tape and a market-purchased pressure-sensitive adhesive tape (commercially available removable PVC adhesive tape) are characterized as follows:

1. 180-degree peel strength test

A 180-degree peel strength test was performed according to the IMASS SP-200 standard. The adhesive tape was cut into 1 inch wide and 12 inches long, and adhered to a clean white-painted plate substrate. Then, the adhesive tape was rolled for one round using a 1 kg stainless steel roller, and the adhesive tape was kept at room temperature for 10 minutes. Then, the peel strength was tested at a speed of 12 inch/min.

2. Aging test 2.1. Adhesion aging test: After a surface protection layer was peeled off from the prepared PVC adhesive tape, the PVC adhesive tape was adhered to a clean white-painted plate substrate to measure the properties of the adhesion sample after aging. Aging was performed on the sample in an oven at 70° C. for 7 days, and then the sample was cooled to room temperature. Then, the 180-degree peel strength was measured.

2.2. Storage aging test: Aging was performed on the prepared PVC adhesive tape in an oven at 70° C. for 7 days

TABLE 2

| Preparation Example | Sample Name | 2EHA/BA/AA | First Temperature (° C.) | Second Temperature (° C.) | Solid Content % | Intrinsic Viscosity (I.V., g/dL) |
|---|---|---|---|---|---|---|
| 1 | AC1 | 48/47.5/4.5 | 60 | 65 | 40.2% | 1.12 |
| 2 | AC2 | 48/47.5/4.5 | 58 | 60 | 40.8% | 1.08 |
| 3 | AC3 | 48/47.5/4.5 | 62 | 67 | 39.5% | 0.89 |
| 4 | AC4 | 46.5/46/7.5 | 63 | 68 | 40% | 1.18 |

Preparation of Pressure-Sensitive
Adhesive-Crosslinking Agent Mixed Solution
(using the Sample Composition of Example 1 as an Example)

20 grams of the acrylic copolymer AC1 (with a solid content of 40.2%, EtOAc as the solvent) of Preparation Example 1 were mixed with 0.32 grams of an ionic crosslinking agent aluminum acetylacetonate Al(acac)$_3$ (with a solid content of 5%) so as to acquire a clear and transparent to simulate storage aging. Then, the sample was cooled to room temperature; the surface protection layer of the adhesive tape was peeled off, and the adhesive tape was adhered to a clean white-painted plate substrate. The adhesive tape was rolled for one round using a 1 kg stainless steel roller, and was kept at room temperature for 10 minutes; then, the 180-degree peel strength was measured.

The composition and characterization results of pressure-sensitive adhesive tapes having different degrees of crosslinking are shown in Table 3.

TABLE 3

| Sample | Composition (Acrylic Copolymer - Crosslinking Agent - Content of Crosslinking Agent) | Initial Peel Strength/ Failure Mode | Peel Strength/ Failure Mode After Adhesion Aging | Peel Strength/ Failure Mode After Storage Aging |
|---|---|---|---|---|
| Example 1 | AC1 - Al(acac)$_3$ - 0.2% | 0.400 Clean peeling | 0.527 Clean peeling | 0.509 Clean peeling |
| Example 2 | AC2 - Al(acac)$_3$ - 0.2% | 0.412 Clean peeling | 0.530 Clean peeling | 0.501 Clean peeling |
| Example 3 | AC3 - Al(acac)$_3$ - 0.2% | 0.426 Clean peeling | 0.539 Clean peeling | 0.499 Clean peeling |
| Example 4 | AC1 - Al(acac)$_3$ - 0.05% | 0.528 Clean peeling | 0.565 Clean peeling | 0.439 Clean peeling |
| Example 5 | AC1 - Al(acac)$_3$ - 0.1% | 0.485 Clean peeling | 0.583 Clean peeling | 0.521 Clean peeling |
| Example 6 | AC1 - Al(acac)$_3$ - 0.15% | 0.462 Clean peeling | 0.537 Clean peeling | 0.576 Clean peeling |
| Example 7 | AC1 - Al(acac)$_3$ - 0.25% | 0.471 Clean peeling | 0.568 Clean peeling | 0.518 Clean peeling |
| Comparative Example 1 | Commercially available removable adhesive tape | 0.344 Clean peeling | 0.064 Clean peeling | 0.136 Clean peeling |
| Comparative Example 2 | AC1 - Al(acac)$_3$ - 0.35% | NA Fluctuant peeling | 0.491 Clean peeling | 0.468 Clean peeling |
| Comparative Example 3 | AC1 - Al(acac)$_3$ - 0.4% | NA Fluctuant peeling | NA Fluctuant peeling | 0.493 Clean peeling |
| Comparative Example 4 | AC1 - RD1054 - 0.5% | 0.315 Clean peeling | 0.27 Clean peeling | 0.13 Clean peeling |
| Comparative Example 5 | AC4 - Al(acac)$_3$ - 0.05% | 0.74 Clean peeling | 1.09 Cohesion-destructive peeling | 0.56 Clean peeling |
| Comparative Example 6 | AC4 - Al(acac)$_3$ - 0.25% | 0.61 Clean peeling | 1.11 Cohesion-destructive peeling | 0.55 Clean peeling |

NA: results are not available

Examples 1-3 show the effects of different intrinsic viscosity. When a crosslinking agent of the same content is used, a pressure-sensitive adhesive tape having high intrinsic viscosity has moderate initial peel strength, and the peel strength does not decrease after aging.

Examples 4-7 show the effects of increasing the amount of a crosslinking agent relative to the amount of an acrylic copolymer in an adhesive. Within an appropriate range, an increase in the amount of the crosslinking agent slightly reduces initial peel strength on a substrate surface, and slightly increases peel strength on a substrate after adhesion aging and storage aging. When the dry weight content of the crosslinking agent accounts for 0.05%-0.25% of the dry weight of the pressure-sensitive adhesive, the initial peel strength, the peel strength after adhesion aging, and the peel strength after storage aging of the PVC pressure-sensitive adhesive tape reach a good balance, and the PVC pressure-sensitive adhesive tape can be used as a removable PVC adhesive tape having stable adhesiveness.

Comparative Example 1 is a market-purchased PVC-based pressure-sensitive adhesive tape. As a removable adhesive tape, the market-purchased PVC-based pressure-sensitive adhesive tape had moderate initial tack, but the adhesiveness thereof significantly decreased after adhesion aging and storage aging.

Comparative Examples 2 and 3 indicate that an overly high content of a crosslinking agent affected the initial peel strength and the peel strength after adhesion aging of a PVC pressure-sensitive adhesive tape, because an overly high degree of crosslinking resulted in relatively great fluctuation in a peeling test value (referred to as "fluctuant peeling" in the table, in which case test data results were not available).

Comparative Example 4 shows the effect of using different types of crosslinking agents. Compared with an organometallic chelating agent (aluminum acetylacetonate) in the examples, a bisamide-type crosslinking agent had moderate initial peel strength. However, after adhesion aging and storage aging, the peel strength decreased to varying extents, and the adhesiveness was unstable after aging.

Comparative Example 5 and Comparative Example 6 show results of using acrylic copolymer and organometallic chelating agent combinations not disclosed herein. The results indicate that when the content of the reactant vinyl carboxylic acid is overly high, the effects of the combination of the acrylic copolymer and the organometallic chelating agent do not meet the requirements.

Figure 2:
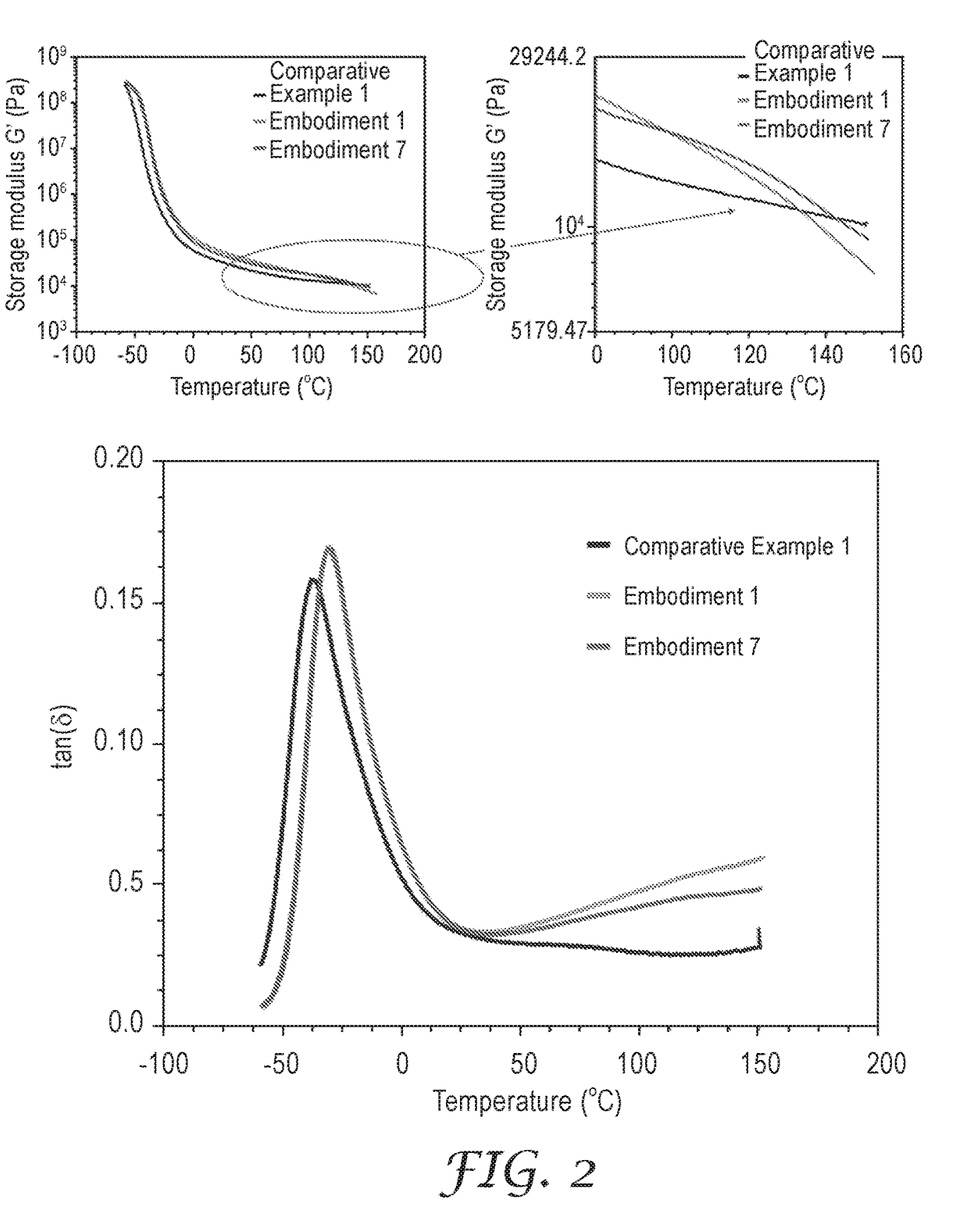
FIG. 2 shows a diagram indicating relationships between storage moduli and phase angles of some pressure-sensitive adhesive compositions and temperature.

Regarding changes in the storage modulus and the phase angle of a pressure-sensitive adhesive at different temperatures, relationships between storage moduli and temperatures and relationships between phase angles and temperatures of Example 1, Example 7, and Comparative Example 1 were measured, as shown in FIG. 2.

FIG. 2 shows changes in the storage moduli (see the upper figure, where the right figure is an enlarged view of the segment above 80° C. of the left figure) and changes in the phase angles (see the lower figure) at different temperatures, and the samples are respectively Comparative Example 1, Example 1 (0.2%), and Example 7 (0.25%). The phase angle δ represents a viscoelastic characteristic of a material (tan δ=G"/G'). When a frequency is fixed at 0.063 Hz and a temperature reaches 120° C., compared with the comparative example, the examples have higher phase angles and storage moduli, indicating better surface wettability and greater crosslinking density/cohesive strength. In summary, the similar properties between Examples 1 and 7 indicate that the wettability and the cohesive strength of the removable PVC pressure-sensitive adhesive tape reach a good balance within a specified crosslinking range, thereby exhibiting good initial tack and moderate strength. Furthermore, a dense and flexible crosslinked network structure formed by means of metal chelation further confines migration of a plasticizer.

Obviously, those skilled in the art may make various modifications and variations to the embodiments of the present disclosure without departing from the spirit and scope of the present disclosure. Thus, if these modifications and variations made to the present disclosure fall within the scope of the claims of the present disclosure and their equivalent technologies, the present disclosure is also intended to include these modifications and variations.

What is claimed is:

1. A pressure-sensitive adhesive composition, the pressure-sensitive adhesive composition consisting of:
    an acrylic copolymer; and
    a crosslinking agent, wherein
    the acrylic copolymer is a reaction product of a mixture of the following monomers:
        a first alkyl (meth) acrylate, an alkyl group in the first alkyl (meth) acrylate having
        at least 6 carbon atoms;
        a second alkyl (meth) acrylate, an alkyl group in the second alkyl (meth) acrylate having 1 to 5 carbon atoms; and
        a vinyl carboxylic acid, the weight ratio of the vinyl carboxylic acid to the mixture being 4% to 5%; wherein in the mixture, the weight ratio of the first alkyl (meth) acrylate to the second alkyl (meth) acrylate is between 0.99:1 and 1:0.97;
    the crosslinking agent is an organometallic chelating agent, the weight ratio of the organometallic chelating agent to the mixture being 0.05% to 0.25%, wherein the pressure-sensitive adhesive composition does not contain an effective amount of a tackifier.

2. The pressure-sensitive adhesive composition according to claim 1,
    wherein the glass transition temperature of the acrylic copolymer is between −65° C. and −50° C.

3. The pressure-sensitive adhesive composition according to claim 1,
    wherein the weight average molecular weight of the acrylic copolymer is in the range of 100,000 to 1,000,000.

4. The pressure-sensitive adhesive composition according to claim 1, wherein the intrinsic viscosity of the acrylic copolymer is in the range of 0.80 to 1.20 grams/deciliter.

5. The pressure-sensitive adhesive composition according to claim 1, wherein the glass transition temperature of a homopolymer of the first alkyl (meth) acrylate is lower than −40° C.

6. The pressure-sensitive adhesive composition according to claim 5, wherein the first alkyl (meth) acrylate is selected from a group consisting of: 2-ethylhexyl (meth) acrylate, isooctyl (meth) acrylate, octyl acrylate, and combinations thereof.

7. The pressure-sensitive adhesive composition according to claim 1, wherein the glass transition temperature of a homopolymer of the second alkyl (meth) acrylate is lower than 10° C.

8. The pressure-sensitive adhesive composition according to claim 7, wherein the second alkyl (meth) acrylate is selected from a group consisting of: butyl (meth) acrylate, ethyl acrylate, methyl acrylate, and combinations thereof.

9. The pressure-sensitive adhesive composition according to claim 1,
    wherein the glass transition temperature of a homopolymer of the vinyl carboxylic acid is in the range of 80° C. to 240° C.

10. The pressure-sensitive adhesive composition according to claim 1, wherein the vinyl carboxylic acid comprises (meth) acrylic acid.

11. The pressure-sensitive adhesive composition according to claim 1, wherein the organometallic chelating agent is aluminum acetylacetonate.

12. A pressure-sensitive adhesive tape, comprising:
    a polyvinyl chloride film containing a plasticizer; and
    a layer of the pressure-sensitive adhesive composition claim 1 on the polyvinyl chloride film.

13. The pressure-sensitive adhesive tape according to claim 12, wherein the thickness of the layer of the pressure-sensitive adhesive composition is 20 μm to 40 μm.

14. A pressure-sensitive adhesive solution, the pressure-sensitive adhesive solution consisting of the pressure-sensitive adhesive composition according to claim 1 and a solvent.

15. The pressure-sensitive adhesive solution according to claim 14, wherein the weight ratio of the acrylic copolymer to the pressure-sensitive adhesive solution is 20% to 50%.

16. A method for preparing a pressure-sensitive adhesive tape, comprising:
    coating a release layer with the pressure-sensitive adhesive solution according to claim 14;
    evaporating the solvent in the pressure-sensitive adhesive solution so as to form a pressure-sensitive adhesive composition layer on the release layer; and
    laminating a polyvinyl chloride film on a surface of the pressure-sensitive adhesive composition layer so as to form the pressure-sensitive adhesive tape.

* * * * *